United States Patent
Cohen et al.

(10) Patent No.: US 7,469,203 B2
(45) Date of Patent: Dec. 23, 2008

(54) WIRELESS NETWORK HYBRID SIMULATION

(75) Inventors: Alain J. Cohen, Washington, DC (US); Pradeep Singh, Arlington, VA (US)

(73) Assignee: OPNET Technologies, Inc., Bethesda, MD (US)

( * ) Notice: Subject to any disclaimer, the term of this patent is extended or adjusted under 35 U.S.C. 154(b) by 613 days.

(21) Appl. No.: 10/923,214

(22) Filed: Aug. 20, 2004

(65) Prior Publication Data

US 2005/0055196 A1 Mar. 10, 2005

Related U.S. Application Data

(60) Provisional application No. 60/497,092, filed on Aug. 22, 2003.

(51) Int. Cl.
*G06F 17/50* (2006.01)
*G06F 9/45* (2006.01)
*G06F 14/173* (2006.01)
*G06F 11/30* (2006.01)

(52) U.S. Cl. .............................. 703/17; 703/13; 703/22; 709/224; 709/225; 709/226; 702/182

(58) Field of Classification Search .................. 703/13, 703/17, 22
See application file for complete search history.

(56) References Cited

U.S. PATENT DOCUMENTS

| | | | | |
|---|---|---|---|---|
| 6,393,480 B1 * | 5/2002 | Qin et al. | ..................... | 709/224 |
| 6,411,997 B1 * | 6/2002 | Dawes et al. | ................ | 709/224 |
| 6,442,141 B1 * | 8/2002 | Borella et al. | ................ | 370/248 |
| 6,820,042 B1 | 11/2004 | Cohen et al. | | |
| 2003/0065769 A1 * | 4/2003 | Kryskow et al. | ............ | 709/224 |
| 2003/0161265 A1 * | 8/2003 | Cao et al. | ..................... | 370/229 |

OTHER PUBLICATIONS

"A Study of the Behaviour of the Mobile Agent in the Network Management Systems", Fahad, Yousef, Strange. Jun. 16-17, 2003.*

* cited by examiner

*Primary Examiner*—Paul L Rodriguez
*Assistant Examiner*—Nithya Janakiraman
(74) *Attorney, Agent, or Firm*—Robert M. McDermott, Esq.

(57) ABSTRACT

A simulation method and system partitions network traffic into background traffic and explicit traffic, wherein explicit traffic is processed in detail, and background traffic is processed at a more abstract level. The packets of explicit traffic are modeled in complete detail, so that precise timing and behavior characteristics can be determined, whereas large volumes of traffic are modeled more abstractly as background flows, and only certain aspects, such as routing through the network, are simulated. Tracer packets are used to model the background traffic and carry a number of characteristics of interest for generating simulation results. In this manner, the effect of the background traffic on the explicit traffic can be modeled at each network element. The abstract processing of background traffic is facilitated by techniques that include multi-variate table look-up, neural networks, and the like.

24 Claims, 2 Drawing Sheets

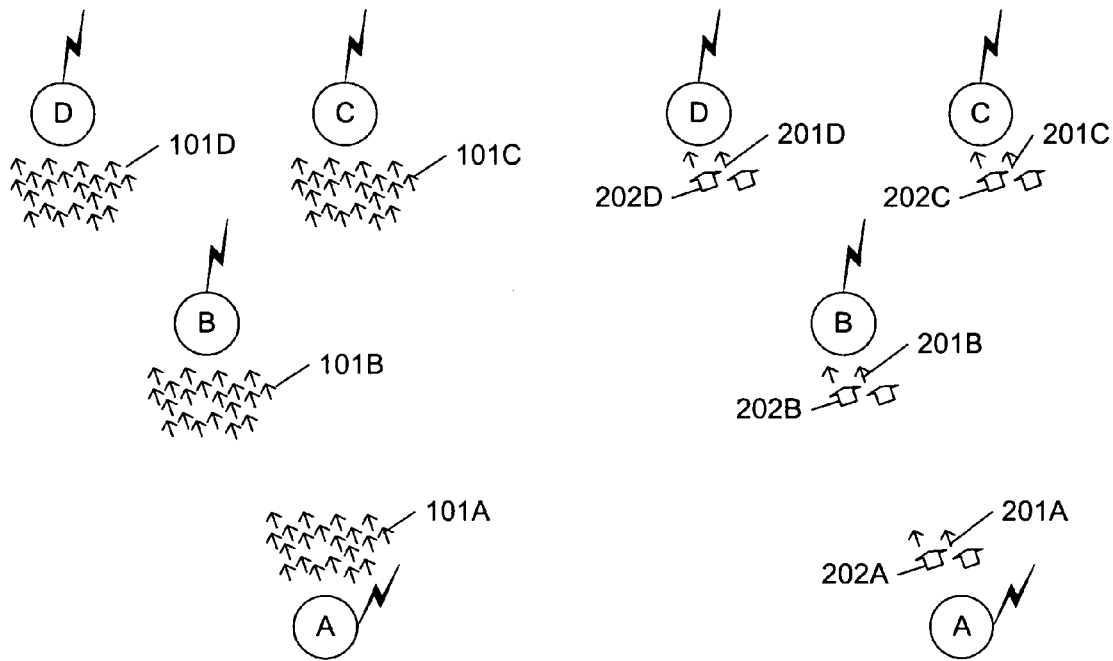
FIG. 1 [PRIOR ART]   FIG. 2
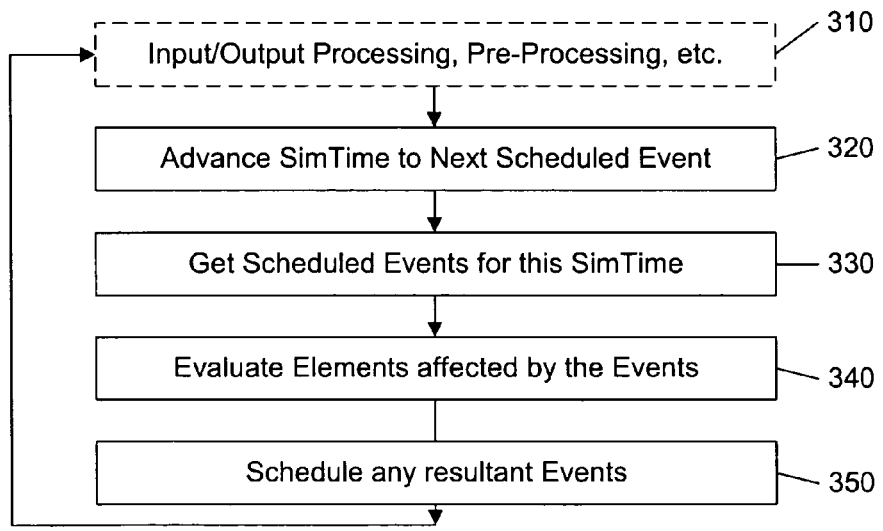
FIG. 3

WIRELESS NETWORK HYBRID SIMULATION

This application claims the benefit of U.S. Provisional Patent Application 60/497,092, filed 22 Aug. 2003.

BACKGROUND AND SUMMARY OF THE INVENTION

This invention relates to the field of simulation systems, and in particular to a network simulator that includes models of wireless nodes or other forms of broadcast communications.

A network simulator is an analysis tool that provides information that is useful for network planning and evaluation. New or existing networks can be analyzed to determine network performance, identify communication bottlenecks, estimate throughput capacity, and so on. Proposed changes to networks can be evaluated via simulation before they are implemented, so that informed choices can be made among considered alternatives.

The simulation of a complex network consumes a substantial amount of computer resources. In a conventional network simulation, the transmission of a packet of information is simulated by the propagation of "events" from one node/element in the network to another. The generation of the packet at the source node is an event that is propagated to the first node along the communication path of this simulated packet. The arrival of this packet at the first node is an event that triggers the modeling of the propagation of this event through the first node, resulting in the generation of a subsequent transmission event from this node and a reception event at the next node along the communication path. This reception event triggers the modeling of the propagation of the event through the second node, and the subsequent transmission-reception events to the next node, and so on. To simulate actual network performance, the processing of an event at a node may trigger multiple events, such as a simulated error likelihood at each node that may result in requests for retransmission from sending nodes.

The scheduling of each of these events and the modeling of the processing of each event through each node consumes computer time and memory, and if there are many simulated transmissions of packets and/or many nodes in each communication path, the simulation of a complex network can take hours, or days, to complete.

The simulation of a "broadcast" event, such as the transmission of a packet from a wireless device, or the transmission of a packet along a cable-TV network, further exacerbates the scheduling and modeling resource requirements of a network simulator. In a conventional point-to-point wired network, a transmission event from one node results in a single reception event at another node. In a wireless network, a transmission event from one node often results in the generation of a reception event at each of the nodes that are within range of transmitting node. In like manner, a transmission event from a cable-TV provider results in the generation of reception events at each receiving node.

An objective of this invention is to provide an efficient method of simulating broadcast traffic in a network simulator. A further objective of this invention is to substantially reduce the processing time associated with the simulation of broadcast traffic in a network simulator. A further object of this invention is to substantially reduce the number of simulated interactions associated with broadcast traffic in a network simulator.

These objectives, and others, are achieved by providing a simulation method and system that partitions network traffic into background traffic and explicit traffic, wherein explicit traffic is processed in detail, and background traffic is processed at a more abstract level. The packets of explicit traffic are modeled in complete detail, so that precise timing and behavior characteristics can be determined, whereas large volumes of traffic are modeled more abstractly as background flows, and only certain aspects, such as routing through the network, are simulated. Tracer packets are used to model the background traffic and carry a number of characteristics of interest for generating simulation results. These tracer packets are propagated through the network in the same manner as any other simulated packet and therefore are processed through each element traversed by the propagation of the background traffic, but each single tracer packet is representative of all of the packets comprising the modeled background traffic. In this manner, the effect of the background traffic on the explicit traffic can be modeled at each network element. The abstract processing of background traffic is facilitated by techniques that include multi-variate table look-up, neural networks, and the like.

BRIEF DESCRIPTION OF THE DRAWINGS

The invention is explained in further detail, and by way of example, with reference to the accompanying drawings wherein:

FIG. 1 illustrates an example simulation of a wireless network in a conventional network simulator.

FIG. 2 illustrates an example simulation of a wireless network in accordance with one aspect of this invention.

FIG. 3 illustrates an example flow diagram of a network simulator in accordance with this invention.

Throughout the drawings, the same reference numerals indicate similar or corresponding features or functions. The drawings are included for illustrative purposes and are not intended to limit the scope of the invention.

DETAILED DESCRIPTION OF THE INVENTION

Figure 4:
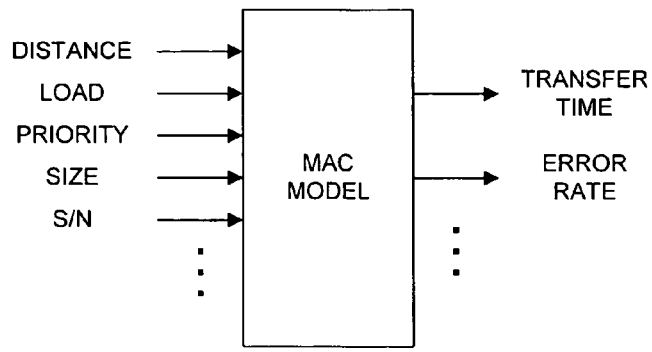
FIG. 4 illustrates an example model of a media access control (MAC) protocol in accordance with another aspect of this invention.

This invention provides an improvement in simulation speed that is particularly well suited for the simulation of wireless networks, networks that include wireless sub-networks, and networks that provide broadcast communication capabilities. For ease of presentation and understanding, the invention is presented using the paradigm of a wireless network; however, the use of this paradigm is not intended to limit the scope of the invention. One of ordinary skill in the art will recognize that some or all of the advantages provided by the techniques presented herein will be applicable to the simulation of wired networks with or without broadcast capabilities as well.

FIG. 1 illustrates an example simulation of a wireless network in a conventional network simulator. In this example, a node A is illustrated as generating multiple transmission events, as indicated by the plurality of arrows 101A. In a conventional simulator, each of these transmission events will cause a corresponding reception event at each of the network nodes B, C, and D within range of node A. These reception events are illustrated by the pluralities of arrows 101B, 101C, and 101D. The time at which each of the reception events occur at each node is estimated based on the distance of each node B, C, D from the broadcasting node A. As discussed above, each reception event at each node within the range of a broadcasting node will trigger the processing of the received event at each node.

In a conventional simulation, each broadcast event from each node requires the scheduling and processing of a corresponding event at multiple other nodes, and this multiplicative effect can have a substantial effect on the time and resources required to simulate a wireless network.

This invention is premised on the realization that, generally, a simulation is performed with a particular objective in mind. For example, in some instances, a particular communication path is of interest; in other instances, the general behavior of the network is of interest; in still other instances, proposed changes to particular nodes of the network are of interest. However, in a conventional simulation system, in order to evaluate the paths or nodes of interest under a particular set of conditions, all of the traffic associated with the given set of conditions must be generated and propagated in order to determine the effects of this traffic on the traffic of interest.

Copending U.S. patent application "MIXED MODE NETWORK SIMULATOR", Ser. No. 09/624,092, filed Jul. 24, 2000 for Alain Cohen, George Cathy, and P J Malloy, Attorney Docket OP990719, discloses a network simulator that distinguishes between background traffic and explicit traffic, and is incorporated by reference herein. In the referenced application, explicit traffic is simulated as discrete events as in a conventional discrete-event simulator, whereas background traffic is simulated using analytical models. To evaluate the impact that the background traffic has on the explicit traffic at each node, discrete events corresponding to the background traffic are generated in the time-vicinity of the explicit event at the node. In this manner, background traffic events that have no affect on the explicit traffic are not simulated, and a substantial improvement in simulation speed is achieved by simulating in detail only the traffic of interest and the background traffic that affects this traffic.

In this invention, the partitioning of network traffic into explicit traffic and background traffic is extented to facilitate the efficient processing of broadcast communications. As in the copending application, explicit traffic is traffic for which detailed simulation results are desired, whereas background traffic is traffic that is simulated primarily to determine its effect on the explicit traffic.

To effectively simulate the effects of background traffic on explicit traffic, the background traffic is propagated through the network, but, in accordance with this invention, this background traffic is propagated in a "composite" form, wherein single representative packets, herein termed "tracer" packets, are configured to represent a composite of packets of background traffic.

FIG. 2 illustrates an example simulation of a wireless network using tracer packets in accordance with this invention. The traffic flow of FIG. 2 is intended to correspond to the traffic flow of FIG. 1 from node A, except that the tracer packets 202A in FIG. 2 replaces multiple packets 101A in FIG. 1. A few individual packets 201A in FIG. 2 correspond to packets 101A of FIG. 1. The packets 201A represent explicit traffic packets, and the tracer packets 202A represent background traffic packets. As illustrated, each of the nodes B, C, D in the vicinity of node A receives each of these explicit packets 201A and the tracer packets 202A, the reception events being illustrated as packets 201B, 201C, 201D and 202B, 202C, 202D.

In the simulation system of this invention, each of the models of the nodes A, B, C, and D are configured to process the packets 201A and 202A similarly with regard to actions at the control plane (routing, buffering, propagating, etc.), so that the overall network performance is properly simulated, including the impact of the background traffic on the explicit traffic. The models of the nodes A, B, C, and D are configured to adjust the state of the node based on traffic flowing through it, using the traffic flow information contained in the tracer packets. The state of the node provides performance characteristics that are used to model the explicit packets in full detail, so that, for example, explicit secondary events, such as a request for retransmission and the subsequent retransmission are modeled, and the actual time required to process and propagate each packet can be properly estimated, based on the effects caused by the background traffic.

The advantages of this aspect of the invention can best be appreciated using an example transmission scenario. In this example, assume that one of the tracer packets 202A represents a set of a hundred packets that are destined for node B via node A, another of the tracer packets 202A represents a set of a thousand packets that are destined for node D via node A, and a dozen explicit packets 201A correspond to packets from a particular source node of interest (not shown) that are routed through node A to node B.

In a conventional simulation of the network of FIG. 1, each of the hundred background packets from A to B, and each of the thousand background packets from A to D, and each of the dozen explicit packets from A to B are simulated as being transmitted from node A, received and processed at node B, received and processed at node C, and received and processed at node D. At node C, the processing will be minimal, because none of the packets are addressed to node C, and only require initial processing and discarding. At node D, on the other hand, the processing will be substantial as the effects of the receipt of a thousand packets at node D are determined. At node B, each of the thousand packets addressed to node D will be initially processed and discarded, and each of the hundred background packets and the dozen explicit packets are processed in full detail.

In a simulator that embodies this invention, on the other hand, the simulation of the network of FIG. 2 will include fourteen events at each of nodes A, B, C, and D. The simulated transmission of the thousand background packets to node D is effected by the transmission of a single tracer packet 202A that represents the thousand packets, the simulated transmission of the hundred background packets to node B by a transmission of a single tracer packet 202A that represents the hundred packets, and the simulated transmission of the dozen explicit packets by a transmission of twelve explicit packets 201A. At the node B, the simulation model of the node includes means for determining how each of the twelve explicit packets 201A are impacted by the hundred background packets 202A addressed to B and the thousand packets 202A addressed to D, using, for example the techniques disclosed in the above referenced copending application, and as discussed further below.

At node D, the processing will be minimal, because instead of simulating the effects of each of the thousand packets that are addressed to D, the simulation model will process the tracer packet 202A representing the thousand packets as a single event. Depending upon the model employed at the node, secondary effects may be generated by the processing of a tracer packet 202A. For example, a tracer packet representing requests for retransmission may be generated and transmitted from node D, and a corresponding new tracer packet from node A may be generated and transmitted, representing these retransmissions. In like manner, if these packets were sent to node D for forwarding to another node, node D will generate and transmit a tracer packet representing these forwarded packets. Obviously, the simulated effects of processing the tracer packet 202A at node D will not be as detailed as the simulated effects of each of the thousand individual packets, and will not provide sufficient information for a detailed analysis; but, because this traffic is deemed background traffic, such a detailed analysis is assumed not to be required.

At node C, the aforementioned processing and discarding of the thousand packets addressed to node D and the hundred packets addressed to node B is replaced by the processing and discarding of the two tracer packets representing this background traffic.

As can be seen from this simple example, substantial scheduling and processing time can be saved using tracer packets to represent multiple broadcast packets. Note also that the tracer packets in a preferred embodiment of this invention also include a "duration" parameter that represents how long the traffic flow that is represented by the tracer packet is to occur. That is, for example, a single tracer packet may represent a flow rate of a hundred packets per minute for the next two hours. Each node receiving this packet would adjust its state/characteristics to model the effects of a hundred packet per minute traffic flow, and will continue to model these effects for the next two hours of simulated time.

FIG. 3 illustrates an example flow diagram of a network simulator. This flow diagram is presented as a general overview of the simulation process, to provide a context for the embodiment of this invention. It is assumed that the network simulator has been provided a description of the network, a description of any constraints, and a description of the traffic to be simulated.

At 310, the simulator processes any input, such as user-defined events or changes, provides any requested output, such as the state of the simulation thus far, and performs whatever preprocessing is necessary to proceed with the simulation of the network.

At 320, the simulator advances the simulation time to the next scheduled event, and at 330, the scheduled events for this simulation time are extracted from an internal scheduler. The scheduled events may include, for example, any traffic events that are scheduled to be generated at this time, as well as any events that have been scheduled based on the propagation of prior events. These events include both explicit traffic events, such as the transmission of an explicit packet 201A from node A, and background traffic events, such as the transmission of a tracer packet 202A from node A. Note that the modeling of multiple background traffic packets as a tracer packet 202A saves substantial time and resources at this stage 330 of the simulation process, because instead of having to extract hundreds or thousands of scheduled packet events from the internal scheduler, only one tracer packet representing these hundreds or thousands of scheduled packet events is extracted from the internal scheduler.

At 340, the elements affected by the events at this time are evaluated. If the event, for example, is the arrival of a packet at a node, the reaction of the node to the event is simulated, and any resultant events, and the time of their occurrence are determined. As noted above, the reaction of a node to an event will be affected by the flow information conveyed by any prior tracer packets whose duration time includes the current time. The resultant events are then scheduled to occur at the appropriate time, at 350. If the event is the transmission of a packet from a node, the evaluation of this event includes a determination of when a reception event will occur at another node. In a broadcast environment, such as a wireless network, the transmission of a packet from a node requires a determination of when a reception event will occur at each node within range of the transmitter, and the subsequent scheduling of each of these reception events.

In a conventional network simulator, as well as in the simulator of this invention, a media-access-control (MAC) model is used to model the transmission of packets between nodes. In a wired point-to-point network, the MAC model may merely be a simple delay model, such that a transmission of a packet at time T1 results in a reception of the packet at time T1+D, where D is the propagation delay required for a transmitted packet from the first node to arrive at the second node. The MAC model may also include a determination of the relative signals strength of the packet at the received node, from which the likelihood of error and/or the need for a re-transmission can be determined. Often, simulation models of elements in a wired network include the transmission delay and other effects, and explicit MAC models are not required, or simple sequential queuing models are used. In a wireless network, however, the delay estimation is more difficult because the media access protocol is significantly more complex than queuing schemes that control access to a serial point-to-point link. Also, the likelihood of lost or errored packets is higher in a wireless network, and the need for modeling the resultant retransmission requests is greater, in order to provide an accurate estimate of overall packet transfer time.

FIG. 4 illustrates an example model of a media access control (MAC) protocol for use in the simulation system of this invention. In general, the MAC protocol's behavior is highly dependent upon the actual device being modeled, as well as the level of detail required of the simulation. For example, the model may include mechanisms for fairness, prioritization, collision avoidance, collision resolution, adaptive power control, and the like. In a preferred embodiment of this invention, a framework is provided within which a user may add, delete, or modify the modeling of the MAC protocol between nodes. Within this framework a default MAC model is provided that includes as input, for example, the distance between the nodes, an aggregate network load, priorities assigned to nodes or particular traffic, sizes of the packets, estimated signal to noise ratio, and so on. The default MAC model's output includes, for example, the transfer time of each packet based on the input parameters, an estimate of the error rate, and/or received signal to noise ratio, and so on.

By modeling background traffic as tracer packets that represent multiple packets, substantial savings are achieved, at 340 of FIG. 3, in the simulation of complex MAC protocols for wireless transmissions, as well as the simulation of all of the node elements within the range of each transmitting node. In like manner, the number of subsequent events that are scheduled at 350 are substantially reduced, thereby saving substantial memory and time resources.

Figure 5A:
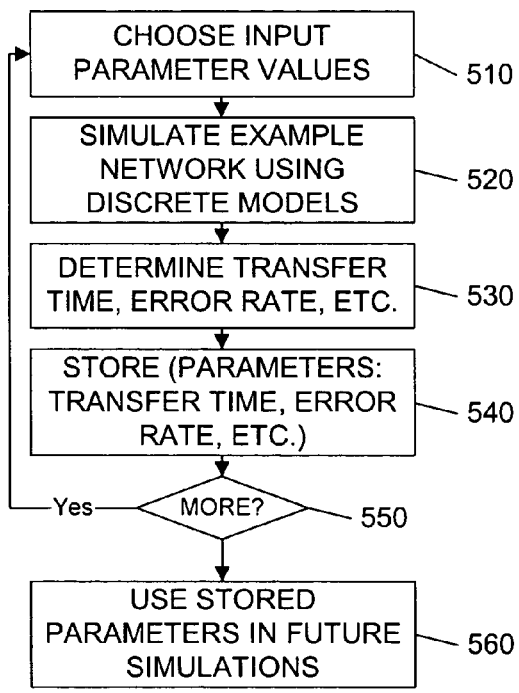
FIGS. 5A and 5B illustrate example methods of creating a MAC model in accordance with this invention.
Figure 5B:
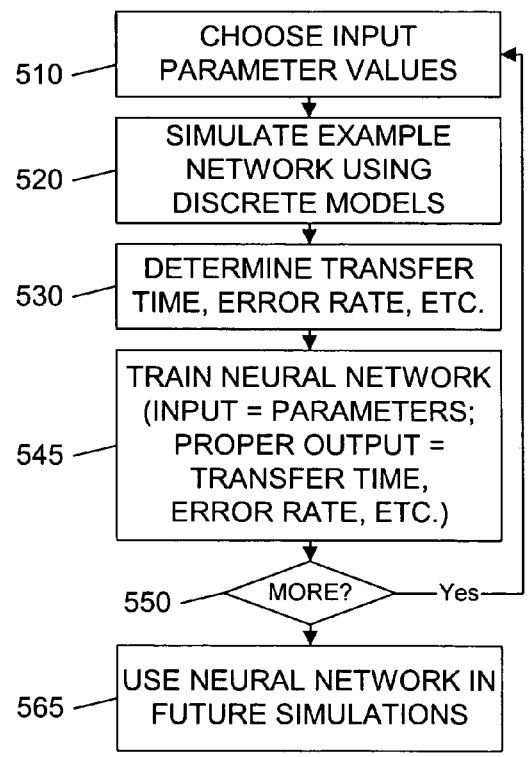

FIGS. 5A and 5B illustrate example methods of creating a MAC model in accordance with this invention. FIG. 5A illustrates an example method wherein the MAC model is embodied in the form of a look-up table, and FIG. 5B illustrates an example method wherein the MAC model is embodied in the form of a neural network. One of ordinary skill in the art will recognize that an analytical model of the MAC protocol may also be used, and/or a combination of analytical modeling and the methods of FIGS. 5A and 5B. For example, mathematical equations could be used to transform parameters such as the distance between nodes, the power output of the transmitter, and the current traffic load into an estimate of a signal to noise ratio at a receiver, using known techniques. This signal to noise estimate could then be used as one of the inputs to a multi-variate table or a neural network, along with the other parameters, such the size of the packet, and others, to determine an estimated transfer time, error likelihood, and so on. In general, however, the use of a table or neural network in lieu of an analytical model eases the task of creating a user-customized MAC model.

In accordance with this preferred embodiment, the multi-variate table is populated and/or the neural network is trained by simulating a discrete model of the MAC protocol under a variety of input conditions, and recording the outputs as a function of these input conditions. Thereafter, during a subsequent network simulation, the populated multi-variate table or the trained neural network is used to determine/estimate the output of each MAC model element, in lieu of the discrete model of the MAC protocol.

To populate the multi-variate table, or to train the neural network, a sample set of input parameter values is selected for simulation, at 510. At 520, an example network that includes discrete elements that model the transfer of packets among nodes via the MAC protocol is simulated using these input parameters. At 530, the resultant output of the simulation based on the given set of input parameters is determined. Note that the process at 530 may include the creation of composite output values, based on, for example, multiple outputs of the simulation at 520, and/or multiple simulations at 520 using the given set of parameters. For example, multiple Monte-Carlo simulations, common in the art, may be performed using the given set of parameters, and the composite output value may include a determined average value of the output of the multiple simulations, as well as a determined variance.

At 540 in FIG. 5A, the determined output values are stored, indexed by the given set of input parameters. As noted above, these stored values will be used in subsequent simulations of actual networks in lieu of modeling the MAC protocol in discrete form. One of ordinary skill in the art will recognize that conventional table-reduction techniques can be applied to reduce the storage and indexing requirements. For example, the input parameters may be quantized based on conventional clustering techniques, redundant entries can be removed, and so on. If, for example, a given input parameter has a minimal effect on the output parameters except in select situations, the collection of minimal-effect table entries can be reduced to a single entry having a "wild-card" entry for that input parameter. In like manner, the continuous range of an input parameter can be reduced to a discrete range, such as "small", "medium", and "large", when the imprecision in the output that is caused by this quantization is considered insubstantial. As noted above, algorithms can be provided in the MAC model to preprocess the input parameters to provide a value for accessing the table (e.g. quantizing a given input parameter into the "small", "medium", and "large" discrete values used to access the table), or, the network may be modeled using these discrete values directly (e.g. the user characterizes the packet sizes being transmitted in the simulated network as being "small", "medium" or "large").

At 545 in FIG. 5B, the given set of input parameter values and the determined output values are used to train a neural network to model the MAC protocol, using techniques common in the art. Generally, each input parameter is represented as an input node to the neural network, and each output parameter is represented as an output node. The input nodes and output nodes are connected to each other via a network of internal nodes having assignable weights. The assigned weights of the internal nodes determine how the effects of a set of values on the input nodes are propagated to the output nodes. When a set of input values is provided to the neural network, a set of output values are produced based on assigned weights at the internal nodes. In a training mode, the provided set of values on the output nodes from the discrete simulation are assumed to be the "correct" output that the neural network should have provided when the given set of input values was provided, and the assigned weights at the internal nodes are adjusted to reduce the difference between the output that the neural network provided and this "correct" output. A learning-rate parameter limits the degree to which the assigned weights can be changed by a single learning event, to preserve the learning (weight values) accrued by previous learning events.

As used herein, the term "neural network" is used in the general sense to represent any of a variety of techniques that are used to model an input-output transform that can be trained to provide an acceptably accurate set of output values for a given set of input values without requiring an explicit description of the transform. One of ordinary skill in the art will recognize that commonly available machine-learning techniques, such as genetic algorithms, Bayesian networks, and the like, conform to this general description, and are included within the scope of this invention.

At 550, the training of the neural network, or the populating of the table, is repeated by looping back to 510 to choose another set of input parameter values, until the neural network MAC model is sufficiently trained and/or the MAC table model is sufficiently populated. The sufficiency of these MAC models is determined by the provider of the model, and is typically based on the level of accuracy and precision required. In a preferred embodiment of this invention, the extremes of the ranges of the input parameters are modeled and simulated, and the number of samples that are modeled and simulated between these extremes is determined based on the variance of the output values between these extremes.

As noted above, the abstract MAC models, in table and/or neural network form, are subsequently used for actual network simulations, at 560 and 565, thereby avoiding the need to simulate each communication between nodes using discrete models. Note that these abstract MAC models are particularly well suited for use in this invention for efficient modeling of both the explicit and background traffic among nodes. For example, an input parameter to these models may be the number of packets represented by the simulated packet, to facilitate the processing of tracer packets that represent multiple background packets. The simulation at 520 that is used to determine the characteristics of the transmission of multiple packets may include the simulated transmission of each of the packets and the simulated reception of each of these packets at each node within range of the transmitting node, to provide accurate results, but this simulation of each of the transmissions and receptions does not need to be repeated when an actual network is being simulated, because the table and/or neural network MAC model provided at 560, 565 provides the characteristics directly.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the use of an abstract MAC model can be used in a simulation of an explicit-traffic-only network and/or the use of tracer packets to represent multiple background traffic packets can be used in a simulation that uses discrete models of the MAC protocol. In like manner, the use of an abstract model to replace a conventional discrete model is not limited to modeling the MAC protocol, and the use of tracer packets to represent multiple packets is not limited to modeling wireless networks. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise; and
h) no specific sequence of acts is intended to be required unless specifically indicated.

We claim:

1. A method of simulating a network comprising:
determining transmission events at a first node of the network,
determining a plurality of reception events at other nodes of the network corresponding to each of the transmission events, and
simulating the reception events at the other nodes;
wherein:
at least one of the transmission events includes an explicit-traffic packet, and
at least another of the transmission events includes a tracer packet that represents a plurality of background-traffic packets, and
simulating the reception events at the other nodes includes determining an effect of the background-traffic packets on the explicit-traffic packet.

2. The method of claim 1, wherein
determining the plurality of reception events includes simulating a model of a media access protocol.

3. The method of claim 2, wherein
simulating the model of the media access protocol includes determining a packet transfer time corresponding to a difference in time between each transmission event and each corresponding reception event.

4. The method of claim 3, wherein
simulating the model of the media access protocol includes determining at least one output value from a table of values.

5. The method of claim 3, wherein
simulating the model of the media access protocol includes providing input values to a neural network to determine at least one output value.

6. The method of claim 1, wherein
determining the plurality of reception events includes:
determining at least one output value from a table of values, and
scheduling a reception event of the plurality of reception events based on the at least one output value.

7. The method of claim 6, further including
determining the at least one output value for inclusion in the table of values, based on simulations using discrete element models.

8. The method of claim 1, wherein
determining the plurality of reception events includes:
providing input values to a neural network to determine at least one output value, and
scheduling a reception event of the plurality of reception events based on the at least one output value.

9. The method of claim 8, further including
training the neural network, based on simulations using discrete element models.

10. The method of claim 1, wherein
simulating the reception events at the other nodes includes:
generating background-traffic events at the other nodes at a simulation time that is prior to a scheduled time of arrival of the explicit-traffic packet, to determine the effect of the background-traffic packets on the explicit-traffic packet, and
terminating the generating of background-traffic events at the other nodes after the effect of the background-traffic packets on the explicit-traffic packet is determined.

11. The method of claim 1, wherein
simulating the reception events at the other nodes includes:
determining a state of each node based on flow information contained in the background-traffic packets received at the node, and
estimating parameters associated with the explicit-traffic packet, based on characteristics associated with the state of the node.

12. The method of claim 11, wherein
each background-traffic packet has an associated duration period, and
determining the state of each node based on the flow information is dependent upon the duration period.

13. The method of claim 11, wherein
estimating the parameters associated with the explicit-traffic packet based on characteristics associated with the state of the node includes determining at least one output value from a table of values.

14. The method of claim 11, wherein
estimating the parameters associated with the explicit-traffic packet based on characteristics associated with the state of the node includes providing input values to a neural network to determine at least one output value.

15. The method of claim 1, wherein
simulating the reception event at the other nodes includes:
simulating the explicit-traffic packet at a first level of detail, and
simulating the background-traffic packets represented by the tracer packet at a second level of detail that is substantially less than the first level of detail.

16. A computer readable medium that includes a program for execution on a processing system that is configured to cause the system to:
determine transmission events at a first node of the network,
determine a plurality of reception events at other nodes of the network corresponding to each of the transmission events, and
simulate the reception events at the other nodes;
wherein:
at least one of the transmission events includes an explicit-traffic packet, and
at least another of the transmission events includes a tracer packet that represents a plurality of background-traffic packets, and simulating the reception events at the other nodes includes determining an effect of the background-traffic packets on the explicit-traffic packet.

17. The computer readable medium of claim 16, wherein determining the plurality of reception events includes determining a packet transfer time corresponding to a difference in time between each transmission event and each corresponding reception event.

18. The computer readable medium of claim 16, wherein simulating the reception events includes determining at least one output value from a table of values.

19. The computer readable medium of claim 16, wherein simulating the reception events includes providing input values to a neural network to determine at least one output value.

20. The computer readable medium of claim 16, wherein determining the plurality of reception events includes:
    determining at least one output value from a table of values, and
    scheduling a reception event of the plurality of reception events based on the at least one output value.

21. The computer readable medium of claim 16, wherein determining the plurality of reception events includes:
    providing input values to a neural network to determine at least one output value, and
    scheduling a reception event of the plurality of reception events based on the at least one output value.

22. The computer readable medium of claim 16, wherein simulating the reception events at the other nodes includes:
    generating background-traffic events at the other nodes at a simulation time that is prior to a scheduled time of arrival of the explicit-traffic packet, to determine the effect of the background-traffic packets on the explicit-traffic packet, and
    terminating the generating of background-traffic events at the other nodes after the effect of the background-traffic packets on the explicit-traffic packet is determined.

23. The computer readable medium of claim 16, wherein simulating the reception events at the other nodes includes:
    determining a state of each node based on flow information contained in the background-traffic packets received at the node, and
    estimating parameters associated with the explicit-traffic packet, based on characteristics associated with the state of the node.

24. The computer readable medium of claim 16, wherein each background-traffic packet has an associated duration period, and
determining the state of each node based on the flow information is dependent upon the duration period.

* * * * *